US010210980B2

(12) United States Patent
Villacres Mesias et al.

(10) Patent No.: US 10,210,980 B2
(45) Date of Patent: Feb. 19, 2019

(54) DYNAMICALLY SUSPENDED HEADLINER

(71) Applicant: FORD GLOBAL TECHNOLOGIES, LLC, Dearborn, MI (US)

(72) Inventors: Diego Fabricio Villacres Mesias, San Mateo Atenco (MX); Guillermo Cesar Cervantes Guaraneros, Atizapan de Zaragoza (MX); Jorge Adolfo Miranda Nieto, Guarajuato (MX); Pablo Isaac Villalva Sanchez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 15/416,538

(22) Filed: Jan. 26, 2017

(65) Prior Publication Data
US 2018/0211752 A1 Jul. 26, 2018

(51) Int. Cl.
| | |
|---|---|
| *H01F 7/18* | (2006.01) |
| *B60R 13/02* | (2006.01) |
| *H01F 7/06* | (2006.01) |
| *B60J 1/00* | (2006.01) |
| *H01F 7/02* | (2006.01) |
| *H01F 7/126* | (2006.01) |
| *H01F 7/128* | (2006.01) |

(52) U.S. Cl.
CPC ............ *H01F 7/1872* (2013.01); *B60J 1/00* (2013.01); *B60R 13/02* (2013.01); *B60R 13/0206* (2013.01); *B60R 13/0212* (2013.01); *H01F 7/021* (2013.01); *H01F 7/06* (2013.01); *H01F 7/126* (2013.01); *H01F 7/128* (2013.01)

(58) Field of Classification Search
CPC ........ H01F 7/1872; H01F 7/126; H01F 7/021; H01F 7/128; B60R 13/0206; B60R 13/0212
USPC ...................... 296/214, 187.06, 212, 187.13
See application file for complete search history.

(56) References Cited

U.S. PATENT DOCUMENTS

| | | | |
|---|---|---|---|
| 5,280,991 A | 1/1994 | Weiland | |
| 5,450,057 A * | 9/1995 | Watanabe | ................ B60Q 9/00 180/169 |
| 5,979,586 A * | 11/1999 | Farmer | ................ B60Q 9/008 180/169 |
| 7,441,832 B2 | 10/2008 | Ratajski et al. | |
| 8,215,684 B2 | 7/2012 | Whitens et al. | |
| 8,742,910 B2 * | 6/2014 | Westerblad | ......... B60R 21/0134 180/274 |
| 8,899,671 B2 | 12/2014 | Huelke | |
| 2001/0012369 A1 * | 8/2001 | Marquiss | ................ H04R 5/02 381/86 |

(Continued)

*Primary Examiner* — Jason S Morrow
*Assistant Examiner* — E Turner Hicks
(74) *Attorney, Agent, or Firm* — Brooks Kushman P.C.

(57) ABSTRACT

A vehicle headliner assembly includes a roof structure having an electromagnet disposed thereon. The vehicle headliner assembly further includes a headliner having at least one permanent magnet disposed thereon. The headliner is secured to the roof structure such that the permanent magnet is adjacent and opposite the electromagnet of the roof structure. The vehicle headliner assembly further includes a controller configured to energize the electromagnet to generate an electromagnetic field to attract or repel the permanent magnet of the headliner relative to the electromagnet.

20 Claims, 4 Drawing Sheets

(56) References Cited

U.S. PATENT DOCUMENTS

| | | |
|---|---|---|
| 2004/0120536 A1* | 6/2004 | McConnell ......... B60R 11/0235 |
| | | 381/302 |
| 2004/0198123 A1 | 10/2004 | Gillingham et al. |
| 2007/0195971 A1* | 8/2007 | Bongiovi ............. H04R 1/1008 |
| | | 381/86 |
| 2008/0042471 A1 | 2/2008 | Kirn et al. |
| 2010/0289288 A1 | 11/2010 | Smith et al. |
| 2014/0001322 A1 | 1/2014 | Joyce et al. |
| 2016/0040693 A1 | 2/2016 | Popovski et al. |

* cited by examiner

DYNAMICALLY SUSPENDED HEADLINER

TECHNICAL FIELD

This disclosure relates to a dynamically suspended headliner, and more particularly, to an electromagnetically-controlled suspended headliner.

BACKGROUND

The body structure of a vehicle roof typically includes a roof panel and several roof headers and bows, which are closed-section or channel-shaped structures secured to the vehicle body. Roof headers and bows extend along the length and across the width of the vehicle roof to provide support for the roof panel. The roof panels, headers, and bows are commonly fabricated from stamped sheet metal.

A headliner is attached to the interior side of the roof structure to provide an attractive appearance for the interior of the vehicle. Headliners are also provided for sound absorption, energy absorption, and/or concealment of electrical wiring and HVAC vents.

Headliners have been attached to the roof of vehicles in a variety of manners, including using screw or snap-in fasteners, adhesives, magnets, and hook and loop type fasteners, such as VELCRO. These manners of attachment are substantially hidden from view, which commonly causes difficulties in manufacturing, as the headliner must be vertically suspended by the assembler to align the fasteners. Further, once the fasteners are attached, they provide little to no movement to allow for adjusting the position of the headliner to attach additional fasteners.

Conventional headliners are generally constructed of a single layer or multiple layers of material joined together and mounted onto the roof structure and/or associated framework. Such headliners are often made of materials, such as, particleboard, fiberboard, plastic board, fabric, and a variety of foams.

Various materials and configurations for headliners have been proposed and tested throughout the automotive industry. For example, headliners may be provided with foam blocks and/or head impact countermeasure (HIC) cones. Such designs are often complex due to the attachment of additional components or due to the overall thickness of the multiple layers, and are often expensive to manufacture and install. Furthermore, upon installation of the headliner, the HIC components in many instances must be modified or tuned to provide proper fit, finish, or function. Such modifications require additional time and cost.

SUMMARY

A vehicle headliner assembly includes a roof structure having an electromagnet disposed thereon. The vehicle headliner assembly further includes a headliner having at least one permanent magnet disposed thereon. The headliner is secured to the roof structure such that the permanent magnet is adjacent and opposite the electromagnet of the roof structure. The vehicle headliner assembly further includes a controller configured to energize the electromagnet to generate an electromagnetic field to attract or repel the permanent magnet of the headliner relative to the electromagnet A vehicle headliner control system includes a controller configured to receive a signal from a detector indicative of an event detection. In response, the controller is configured to vary a current flow through an electromagnet disposed on a roof structure of a vehicle to vary a spacing between the electromagnet and a permanent magnet disposed on a headliner.

A method for controlling a spacing of a headliner relative to a roof structure of a vehicle includes energizing an electromagnet disposed on the roof structure to generate an electromagnetic field to attract or repel a permanent magnet disposed on the headliner to increase or decrease a spacing of the headliner relative to the roof structure at the electromagnet.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
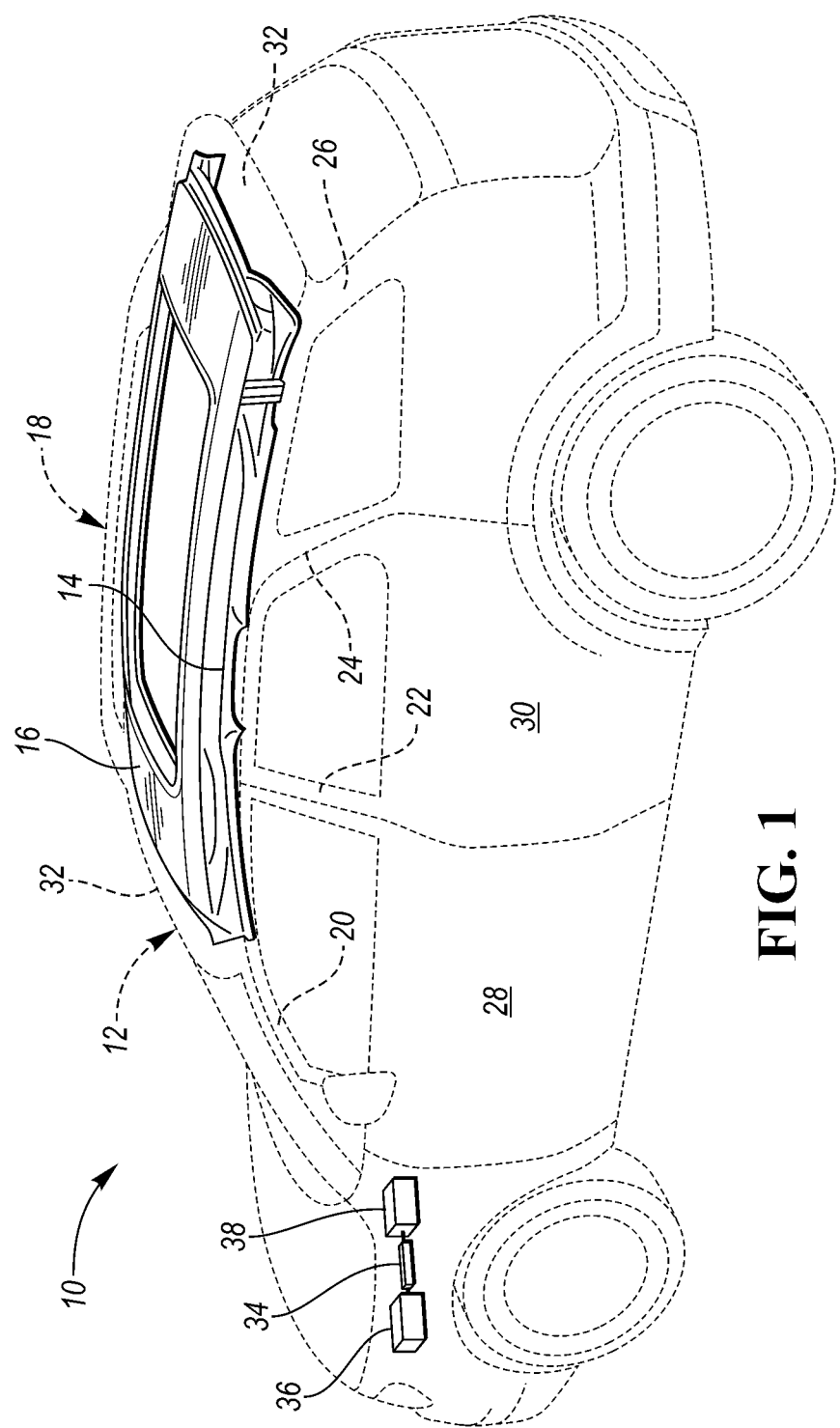
FIG. 1 is a top perspective view of a vehicle having a headliner attachment system.

For purposes of description herein, the terms "upper," "lower," "right," "left," "rear," "front," "forward," "rearward," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 includes a headliner attachment system 12 for attaching a headliner 14 to a roof structure 16 to form a roof 18 of the vehicle 10. The roof 18 is supported by various pillars, including an A-pillar 20, a B-pillar 22, a C-pillar 24, and a D-pillar 26. A front door 28 is defined between the A-pillar 20 and the B-pillar 22, and a rear door 30 is defined between the B-pillar 22 and the C-pillar 24. The opposing side of the vehicle 10 similarly includes a corresponding arrangement of pillars that support the opposing side of the roof 18. A header 32 extends between the A-pillars 20 and the D-pillars 26 to support the front and rear portions of the roof 18, respectively. It is contemplated that various alternative pillar arrangements may support the vehicle roof 18 having the headliner 14 attachment of the present disclosure. Accordingly, the vehicle 10 may conceivably include alternative vehicle types, such as cars, trucks, boats, and other conceivable vehicles as generally understood by one having ordinary skill in the art.

The vehicle 10 also includes a controller 34 such an electronic control unit. The controller 34 may be a dedicated headliner control module for controlling the headliner attachment system 12, as discussed in greater detail elsewhere herein.

The controller 34 is operatively connected to a battery 36. The battery 36 may be a low voltage (LV) battery, such as a 12-volt battery. In one approach, the battery 36 is a dedicated battery in communication with the controller 34. In another approach, the battery 36 may be used to power various vehicle accessories such as headlights, and/or vehicle auxiliary systems such as HVAC systems for heating, cooling, or otherwise controlling the climate of the interior of the vehicle 10, heating systems for defrosting windows, heating systems for heating seats or a steering wheel, exhaust/cooling fans, or power systems for providing power to charge or operate third party devices such as mobile phones, GPS devices, etc. In still another approach (not shown), the controller 34 is operatively connected to a vehicle propulsion battery, such as a high voltage battery that is capable of outputting electrical power to the vehicle propulsion system.

In some approaches, the controller 34 is operatively connected to an impact detection system 38. For example, through the impact detection system 38, the controller 34 may receive data from impact sensors (not shown) such as accelerometers and the like, pre-impact sensors such as radar sensors, image sensors, etc., as well as occupant sensors, e.g., indicating weight, height, age, etc. of one or more vehicle occupants, seat sensors indicating a seat position or positions, seat belt buckle sensors, indicating a status of a seatbelt, e.g., buckled or unbuckled, etc.

Although the controller 34, the battery 36, and the impact detection system 38 are shown in FIG. 1 in the front quarter-panel of the vehicle 10, one or all of the controller 34, the battery 36, and the impact detection system 38 may be disposed at any suitable location in the vehicle 10.

Figure 2:
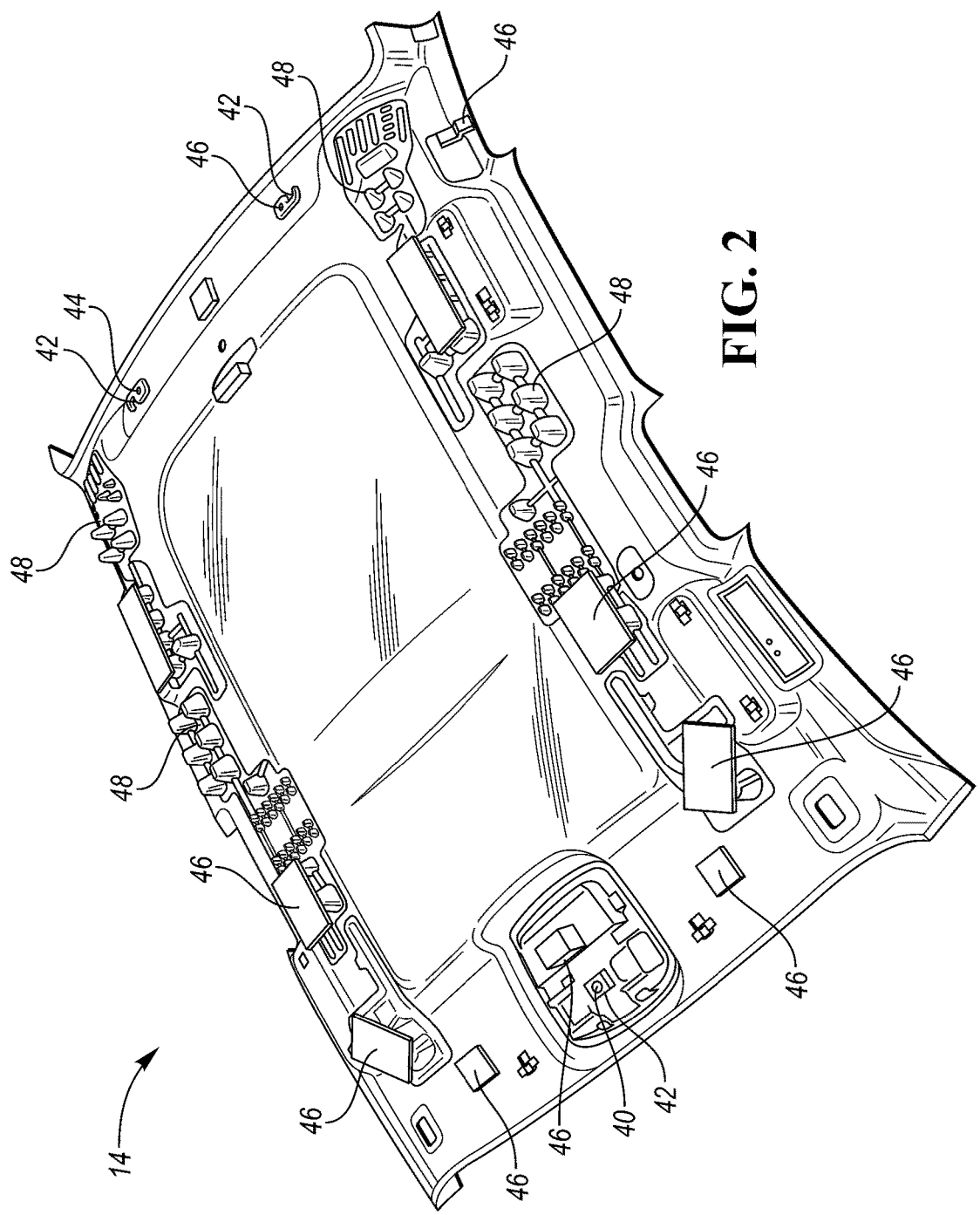
FIG. 2 is a top perspective view of an exemplary headliner.

Referring now to FIG. 2, the headliner 14 may be secured to an underside of the roof structure 16 at various attachment regions. For example, a forward region of the headliner 14 may be provided with one or more locators 40 (e.g., a four-way locator pin) and a magnet 42 for magnetically coupling to a ferrous member on the roof structure 16 opposite the magnet 42. A rearward region of the headliner 14 may be provided with one or more locators 44 (e.g., two-way locator pins) and a magnet 42 for magnetically coupling to a ferrous member on the roof structure 16 opposite the magnet 42. The headliner 14 may also be provided with additional magnets or one or more mechanical fasteners (not shown) for securing the headliner 14 to the roof structure 16. For example, retainer clips may be used at grab-handle regions to support the headliner 14 under the roof structure. In still other examples, the headliner 14 may be welded to the roof structure 16 at one or more weld locations (not shown).

In this way, regions of the headliner 14 may be rigidly secured to the roof structure 16 such that the spacing between the headliner 14 and the roof structure 16 is fixed in these regions. However, as will be apparent, the spacing between the headliner 14 and the roof structure 16 may be adjustable in regions where the headliner 14 is not rigidly secured to the roof structure 16.

In one approach, shown in FIG. 2, the headliner 14 may be provided with additional components for absorption of impact energy. For example, foam blocks 46 and/or HIC cones 48 may be secured to the headliner 14 for increased structural performance. Foam blocks 46 and HIC cones 48 may be used to control spacing between the headliner 14 and the roof structure 16 at locations where the headliner 14 is not rigidly secured to the roof structure 16. However, to modify or tune the spacing at such locations (for example, to provide proper fit, finish, or function), the foam blocks 46 and HIC cones 48 typically must be manually manipulated or replaced.

Figure 3:
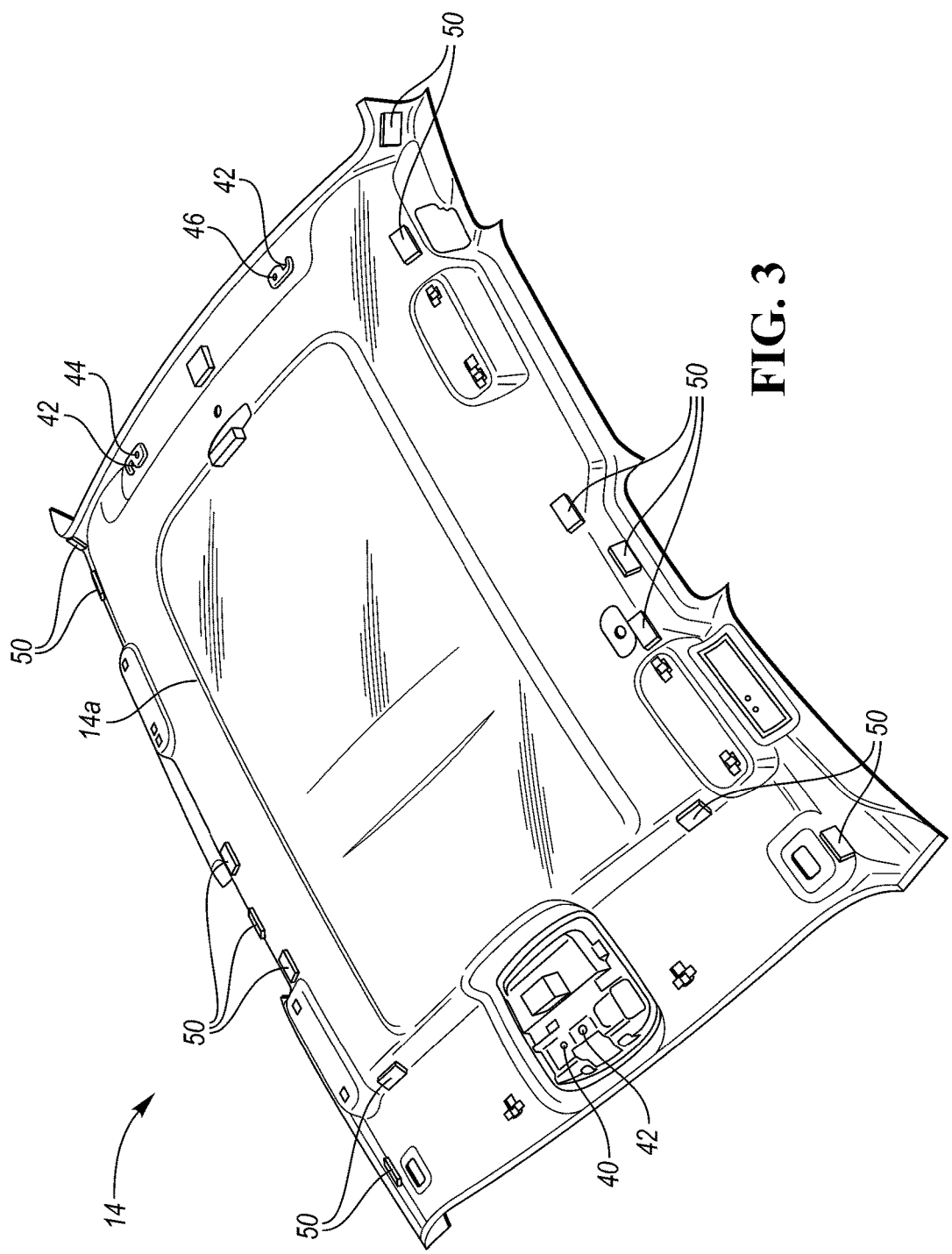
FIG. 3 is a top perspective view of another exemplary headliner.

In a preferred approach, shown in FIG. 3, the headliner 14 includes at least one magnet 50 disposed on an upper region 14a of the headliner 14. The magnets 50 are preferably formed of ferromagnetic metals, rare earth metals (e.g., neodymium), or composites (e.g., ferrite), and are preferably permanent magnets. The magnets 50 may have any suitable shape, such as a disc or bar. As shown in FIG. 3, the magnets 50 are preferably encapsulated within plastic modules. The plastic modules are preferably adhered to the headliner 14, for example, using hot melt glue. However, the plastic modules may be secured to the roof structure 16 through any suitable approach, including welding or using or mechanical fasteners.

Figure 4:
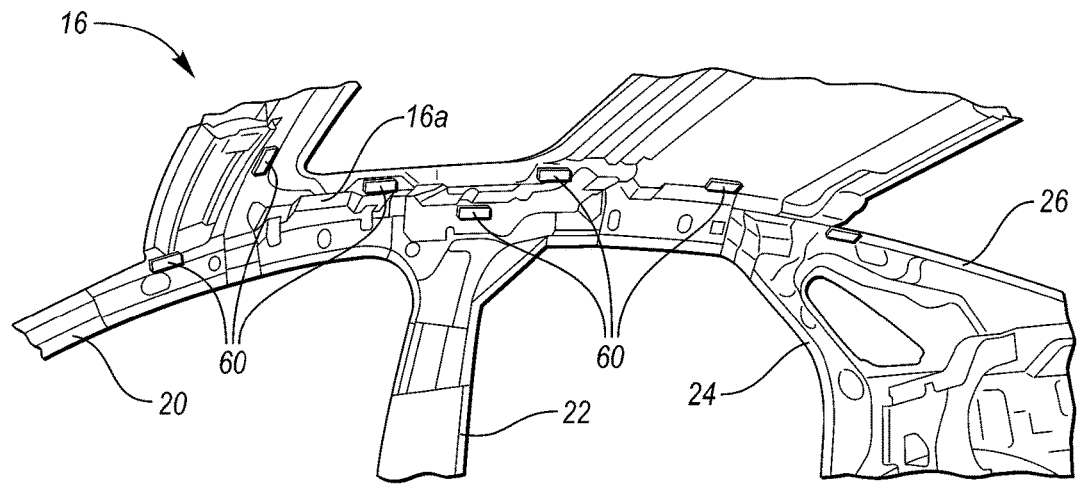
FIG. 4 is a bottom perspective view of an exemplary roof structure.

Referring to FIG. 4, the roof structure 16 includes at least one electromagnet 60 disposed on a lower region 16a of the roof structure 16. The electromagnets 60 are preferably located and aligned to be electromagnetically coupled to corresponding magnets 50 to form a magnetic coupling. As shown in FIG. 4, the electromagnets 60 are preferably encapsulated within plastic modules. The plastic modules are preferably bolted to the roof structure 16. However, the plastic modules may be secured to the roof structure 16 through any suitable approach, including welding, using an adhesive (e.g., hot melt glue), or using other mechanical fasteners (e.g., clips).

The electromagnetic couplings (e.g., magnets 50 and electromagnets 60) are preferably disposed in the roof 16 at common head impact areas. For example, the magnets 50 and electromagnets 60 may disposed adjacent or in proximity to the A-pillar 20, the B-pillar 22, the C-pillar 24, and/or the D-pillar 26. Although the headliner attachment system 12 described herein includes magnets 50 attached to the headliner 14 and electromagnets attached to the roof structure 16, it is expressly contemplated herein that any suitable combination or arrangement of magnets 50 and electromagnets 60 on the headliner 14 and roof structure 16 may be provided. For example, the headliner 14 may be provided with one or more electromagnetic coils, and the roof structure 16 may be provided with corresponding magnets. Furthermore, although the headliner attachment system 12 described herein is substantially free of HIC components (e.g., foam blocks 46 and/or HIC cones 48), the headliner attachment system may be provided with such HIC components in addition to electromagnetic couplings (e.g., magnets 50 and electromagnets 60).

Figure 5:
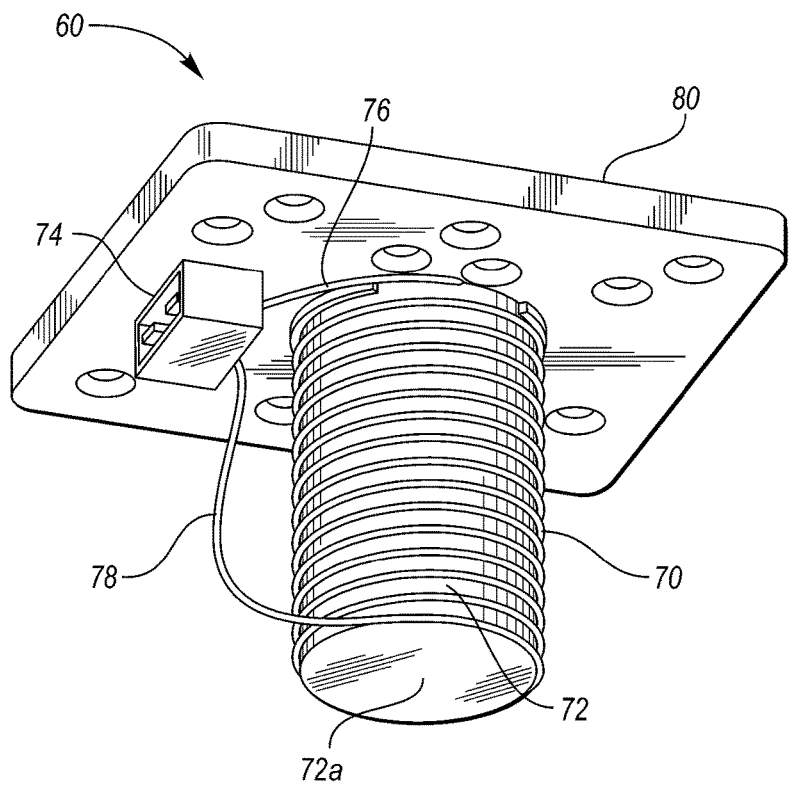
FIG. 5 is a perspective view of an exemplary electromagnet.

As shown in FIG. 5, the electromagnet 60 may have an electromagnetic coil 70 disposed about a core 72, which is preferably a cylindrical core. The core 72 may be formed of a ferromagnetic or ferrimagnetic material and serves to concentrate the magnetic flux and increase magnetic field of the electromagnet 60. The electromagnetic coil 70 is shown having a plurality of turns wrapped around the core 72.

The electromagnet also includes a power interface 74 adapted to receive power, for example, from a wire harness. The power interface is electrically coupled to a first and second terminals 76, 78 of the electromagnetic coil 70 to distribute current through the electromagnetic coil 70.

The core 72 and power interface 74 may be secured to a plastic mounting plate or carrier 80. The mounting carrier 80 shown in FIG. 5 may be, for example, part of a plastic module that encapsulates the electromagnet 60, as previously discussed. The plastic modules secure the coil 70 and core 72 in place and provide isolation from the attachment features.

The mounting carrier 80 may have a plurality of holes disposed therethrough. The holes provide attachment capabilities for securing the carrier plate 80, and thereby, the electromagnet 60, to the vehicle. For example, the holes may permit hot melt to pass therethrough, or may provide through holes for mechanical fasteners such as bolts.

The electromagnetic coil 70 is electrically energized by current, for example, as controlled by the controller 34 through a wire harness, to create a polarity about the core 72. When electrical current is applied to the coil terminals 76, 78, an electromagnetic field is generated. When electrical current is applied to the coil 70 in a first direction, a first electromagnetic field is generated causing a first polarity about the core 72. For example, current in a first direction may generate a south polarity S on one end 72a of the core 72. When the electrical current is reversed in an opposite direction on coil 70, the electromagnetic field is in the opposite direction, such that an opposite second polarity (e.g., a north polarity N) is generated on the end 72a of the core 72. The strength of the magnetic field generated at the core 72 may depend upon the amount of current applied to the coil 70 and the number of turns of coil 70. While a single coil 70 is illustrated herein, it should be appreciated that a plurality of coils may be employed.

As previously discussed, during manufacture of a roof 18 of a vehicle 10, the headliner 14 is secured to the roof structure 16 at various locations (e.g., at locators 40, 44) using various approaches (e.g., magnets, mechanical fasteners, etc.). In a preferred approach, once the headliner 14 is secured to the roof structure 16, the controller 34 automatically adjusts the nominal or starting spacing. The adjustment may be based on a standard parameter defined to assure proper fit and finish to the adjacent interior trim components. In some instances, the nominal spacing may be adjusted depending on body frame variation. It is preferred, therefore, that the corresponding parameter stored in the controller 34 allows for flexibility to make adjustments as needed.

In previous approaches, control over the spacing between the headliner 14 and the roof structure is typically limited. However, through the controller 34, spacing between the headliner 14 and the roof structure 16 may be controlled at the magnetic couplings of the headliner attachment system 12. More specifically, the controller 34 is adapted to control current supplied to the electromagnets 60, which in turn affects the magnetic forces between the magnets 50 and corresponding electromagnets 60. In a preferred approach, the controller 34 is capable of controlling current supplied to individual electromagnets, for example, through a wire harness. The controller 34 may also be capable of controlling current supplied to groups of electromagnets, or all electromagnets.

When no current is supplied through the coil 70, the headliner 14 and the roof structure 16 are maintained in a neutral spacing configuration. When the controller supplies current through the coil 70 in a first direction, the electromagnet 60 has the same polarity as a corresponding magnet 50. In this way, the electromagnet 60 and corresponding magnet 50 experience a repulsion force having a magnetic flux density proportional to the magnitude of the current flowing through the coil 70 in the first direction. The repulsion force increases the spacing between the headliner 14 and the roof structure 16 from the neutral spacing configuration. Reducing the current in the first direction reduces the repulsive force between the headliner 14 and the roof structure 16, thereby reducing the spacing. Conversely, increasing the current in the first direction increases the repulsive force between the headliner 14 and the roof structure 16, thereby increasing the spacing.

Similarly, when the controller 34 supplies current through the coil 70 in a second direction, the electromagnet 60 has the opposite polarity as a corresponding magnet 50. In this way, the electromagnet 60 and corresponding magnet 50 experience an attractive force having a magnetic flux density proportional to the magnitude of the current flowing through the coil 70 in the second direction. The attractive force decreases the spacing between the headliner 14 and the roof structure 16 from the neutral spacing configuration. Increasing the current in the second direction increases the attractive force between the headliner 14 and the roof structure 16, thereby decreasing the spacing. Conversely, reducing the current in the second direction reduces the attractive force between the headliner 14 and the roof structure 16, thereby increasing the spacing.

During manufacture, the controller 34 may fine-tune the spacing between one or all electromagnetic couples to provide proper fit, finish, and function of the headliner 14. As used herein, proper fit and finish refers to spacing between the headliner 14 and the roof structure 16. More specifically, proper fit and finish refers to the final appearance of the headliner 14 to the adjacent trim components. Also as used herein, proper function refers to the intended characteristics of the headliner 14 (e.g., to provide sound absorption, energy absorption, concealment of electrical wiring and HVAC vents, and otherwise to provide an attractive appearance for the interior of the vehicle 10).

As previously described, the controller 34 may be operatively connected to an impact detection system 38. In this way, upon detection of an impact or impending impact, the controller 34 may modify the current supplied to the electromagnets 60, thereby modifying the spacing between the headliner 14 and the roof structure 16. For example, the controller 34 may supply current to the electromagnets 60 such that the spacing between the headliner 14 and the roof structure 16 is increased from the nominal spacing. The amount of current supplied to the electromagnets 60 to increase the spacing is preferably proportional to the desired increase in spacing, as programmed in the controller 34. Furthermore, the desired increase in spacing may be proportional to an impact magnitude as detected by the impact detection system 38. In another approach, the controller 34 may supply current to the electromagnets 60 such that the spacing between the headliner 14 and the roof structure 16 is decreased from the nominal spacing. By increasing the spacing between the headliner 14 and the roof structure 16, the headliner 14 may act as an "electromagnetic bag" during an impact event, which may reduce injury of a vehicle occupant.

An impact detection logic routine may be performed by a controller (e.g., controller 34). The routine may begin by receiving a pre-collision signal from the impact detection system. In response, a determination is made as to whether a collision mode is enabled. If the collision mode is not enabled, the routine enables the collision mode.

In the collision mode, the controller increases a current flow through at least one electromagnet (e.g., electromagnet 60). The electromagnet may be disposed in a head impact zone of the vehicle.

The routine may then determine whether an imminent collision signal has been received (e.g., from the impact detection system). If an imminent collision signal has not been received, the routine reduces the current flow through the at least one electromagnet. The current flow may be reduced to a default, pre-collision value. The routine may further disable the collision mode, and return to monitoring for a pre-collision signal from the impact detection system.

If an imminent collision signal has been received, the routine determines whether a curtain airbag will deploy. If a curtain airbag will deploy, the routine reduces the current flow through the at least one electromagnet. Current may be reduced until the electromagnet is completely disabled (i.e., no magnetic field is generated) in order to prevent any delay in curtain airbag deployment time. The routine may further disable the collision mode, and return to monitoring for a pre-collision signal from the impact detection system.

If a curtain airbag will not deploy, the routine monitors the current flow through the at least one electromagnet. The routine may then monitor for a reverse/inverse current peak. When the reverse current exceeds a predefined threshold, the routine may progressively reduce the current. Furthermore, the routine may reverse the polarity.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle headliner assembly comprising:
   a roof structure having an electromagnet disposed thereon;
   a headliner having a locator pin and a permanent magnet disposed thereon, the headliner secured to the roof structure such that the permanent magnet is adjacent and opposite the electromagnet and the locator pin engages the roof structure; and
   a controller configured to energize the electromagnet to generate an electromagnetic field to spatially move the permanent magnet relative to the electromagnet.

2. The vehicle headliner assembly of claim 1, wherein the controller is configured to apply a current flow in a first direction through an electromagnetic coil of the electromagnet to provide a first electromagnet polarity, the first electromagnet polarity corresponding to a polarity of the permanent magnet, and wherein applying current flow in the first direction repels the permanent magnet of the headliner relative to the electromagnet of the roof structure.

3. The vehicle headliner assembly of claim 2, wherein the controller is configured to increase the current flow in the first direction to increase a spacing between the permanent magnet of the headliner and the electromagnet of the roof structure.

4. The vehicle headliner assembly of claim 2, wherein the controller is configured to apply a current flow through the electromagnetic coil in a second direction opposite the first direction to provide a second electromagnet polarity, the second electromagnet polarity opposite the polarity of the permanent magnet, and wherein applying current in the second direction attracts the permanent magnet of the headliner relative to the electromagnet of the roof structure.

5. The vehicle headliner assembly of claim 4, wherein the controller is configured to increase the current flow in the second direction to decrease a spacing between the permanent magnet of the headliner and the electromagnet of the roof structure.

6. The vehicle headliner assembly of claim 1, wherein the controller is adapted to receive a signal from a detector indicative of an event detection, and wherein in response to receiving the signal, the controller is adapted to vary a current flow through an electromagnetic coil of the electromagnet to attract or repel the permanent magnet of the headliner relative to the electromagnet of the roof structure.

7. The vehicle headliner assembly of claim 6, wherein the detector comprises an impact sensor detecting a vehicle impact event.

8. The vehicle headliner assembly of claim 6, wherein in response to receiving the signal, the controller varies the current flow such that a spacing between the permanent magnet of the headliner and the electromagnet of the roof structure is changed.

9. The vehicle headliner assembly of claim 8, wherein varying the current flow comprises increasing current flow in a first direction to increase a repulsion force between the electromagnet and the permanent magnet to increase a spacing between the headliner and the roof structure.

10. The vehicle headliner assembly of claim 8, wherein varying the current flow comprises reducing current flow in a second direction to reduce an attraction force between the electromagnet and the permanent magnet to increase the spacing between the headliner and the roof structure.

11. A vehicle headliner control system comprising:
    a controller configured to receive a signal from a detector indicative of an event detection, and in response, vary a current flow through an electromagnet disposed on a roof structure of a vehicle to vary a spacing between the electromagnet and a permanent magnet disposed on a headliner.

12. The vehicle headliner control system of claim 11, wherein the controller is configured to apply a current flow in a first direction through an electromagnetic coil of the electromagnet to provide a first electromagnet polarity, the first electromagnet polarity corresponding to a polarity of the permanent magnet, and wherein applying current flow in the first direction repels the permanent magnet of the headliner relative to the electromagnet of the roof structure.

13. The vehicle headliner control system of claim 12, wherein in response to receiving the signal, the controller is configured to increase current flow in a first direction to increase a repulsion force between the electromagnet and the permanent magnet to increase a spacing between the headliner and the roof structure.

14. The vehicle headliner control system of claim 11, wherein the controller is configured to apply a current flow in a second direction through an electromagnetic coil of the electromagnet to provide a second electromagnet polarity, the second electromagnet polarity opposite a polarity of the permanent magnet, and wherein applying current in the second direction attracts the permanent magnet of the headliner relative to the electromagnet of the roof structure.

15. The vehicle headliner control system of claim 14, wherein in response to receiving the signal, the controller is configured to reduce current flow in a second direction to reduce an attraction force between the electromagnet and the permanent magnet to increase the spacing between the headliner and the roof structure.

16. A method for controlling a spacing of a headliner relative to a roof structure of a vehicle, comprising:

energizing an electromagnet disposed on the roof structure to generate an electromagnetic field to attract or repel a permanent magnet disposed on the headliner to increase or decrease a spacing of the headliner relative to the roof structure at the electromagnet to an offset spacing, and to maintain the offset spacing while energizing the electromagnet.

17. The method of claim 16, wherein energizing the electromagnet comprises:
applying a current flow in a first direction through an electromagnetic coil of the electromagnet to provide a first electromagnet polarity, the first electromagnet polarity corresponding to a polarity of a permanent magnet disposed on the headliner, wherein applying the current flow in the first direction repels the headliner relative to the roof structure at the electromagnet.

18. The method of claim 17, wherein energizing the electromagnet comprises:
applying a current flow in a second direction through the electromagnetic coil of the electromagnet to provide a second electromagnet polarity, the second electromagnet polarity opposite the polarity of the permanent magnet disposed on the headliner, wherein applying the current flow in the second direction attracts the headliner relative to the roof structure at the electromagnet.

19. The method of claim 16, further comprising:
receiving a signal from a detector indicative of an event detection; and
responsive to receiving the signal, varying a current flow through an electromagnetic coil of the electromagnet to vary a spacing between the headliner and the roof structure of the vehicle.

20. The method of claim 19, wherein varying the current flow comprises:
successively varying the current flow through the electromagnetic coil such that a spacing between the headliner and the roof structure successively increases, wherein successively varying the current flow comprises at least one of:
successively increasing current flow in a first direction to successively increase a repulsion force between the electromagnet and the permanent magnet disposed on the headliner to increase the spacing between the headliner and the roof structure; and
successively decreasing current flow in a second direction to successively decrease an attraction force between the electromagnet and the permanent magnet disposed on the headliner to increase the spacing between the headliner and the roof structure.

* * * * *